US011518539B2

(12) United States Patent
Heuer

(10) Patent No.: US 11,518,539 B2
(45) Date of Patent: Dec. 6, 2022

(54) EMERGENCY LOCALIZATION DEVICE, IN PARTICULAR ELT, FOR INITIATING AN EMERGENCY MEASURE

(71) Applicant: Airbus Operations GmbH, Hamburg (DE)

(72) Inventor: Carsten Heuer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 517 days.

(21) Appl. No.: 16/543,899

(22) Filed: Aug. 19, 2019

(65) Prior Publication Data

US 2020/0140116 A1 May 7, 2020

(30) Foreign Application Priority Data

Sep. 6, 2018 (DE) .......................... 102018007062.0

(51) Int. Cl.
*B64D 45/00* (2006.01)
*G01P 1/02* (2006.01)
*G01P 15/18* (2013.01)

(52) U.S. Cl.
CPC .............. *B64D 45/00* (2013.01); *G01P 1/023* (2013.01); *G01P 15/18* (2013.01); *B64D 2045/0065* (2013.01); *B64D 2045/0085* (2013.01)

(58) Field of Classification Search
CPC ............ B64D 45/00; B64D 2045/0065; B64D 2045/0085; B64D 25/00; G01P 1/023; G01P 15/18
See application file for complete search history.

(56) References Cited

U.S. PATENT DOCUMENTS

| | | | |
|---|---|---|---|
| 6,260,508 B1* | 7/2001 | Morse | G08B 5/002 116/211 |
| 8,489,259 B2* | 7/2013 | Vinue Santolalla | B64D 45/00 455/96 |
| 8,766,820 B2* | 7/2014 | Santiago Fontaina | B64D 45/00 340/953 |

(Continued)

FOREIGN PATENT DOCUMENTS

| | | |
|---|---|---|
| DE | 102007048956 A1 | 4/2009 |
| DE | 102016122042 A1 | 5/2017 |
| EP | 2996103 A1 | 3/2016 |

OTHER PUBLICATIONS

German Search Report; priority document.
(Continued)

*Primary Examiner* — Mussa A Shaawat
(74) *Attorney, Agent, or Firm* — Greer, Burns & Crain, Ltd.

(57) ABSTRACT

An emergency localization device for initiating an emergency measure, wherein the emergency localization device comprises a control unit, at least one acceleration sensor and at least one position sensor, the control unit being configured to receive a plurality of motion and/or position parameters from the acceleration sensor and/or from the position sensor, and by evaluating the plurality of motion or position parameters to determine a risk level for an emergency using a predefined logic, and to initiate an emergency measure if the calculated risk level exceeds a predefined threshold. The emergency localization device is reliable, robust and largely independent of aircraft-mounted systems.

18 Claims, 2 Drawing Sheets

(56) References Cited

U.S. PATENT DOCUMENTS

| | | | | |
|---|---|---|---|---|
| 9,586,693 | B1* | 3/2017 | Heinrich | B64D 45/00 |
| 9,738,398 | B1* | 8/2017 | Wang | G01S 1/725 |
| 9,783,318 | B2 | 10/2017 | Girod et al. | |
| 10,713,859 | B1* | 7/2020 | McZeal, Jr. | G01S 19/17 |
| 2012/0191273 | A1* | 7/2012 | Jacobs | B64D 45/0059 |
| | | | | 701/3 |
| 2014/0143839 | A1* | 5/2014 | Ricci | H04N 21/814 |
| | | | | 726/4 |
| 2014/0277924 | A1 | 9/2014 | Van Den Heuvel et al. | |
| 2015/0134154 | A1 | 5/2015 | Colin | |
| 2016/0047880 | A1* | 2/2016 | Helfrick | G01S 5/0231 |
| | | | | 340/981 |
| 2016/0075444 | A1* | 3/2016 | Girod | G08G 5/0056 |
| | | | | 701/45 |
| 2016/0075446 | A1* | 3/2016 | Girod | G06N 7/02 |
| | | | | 340/963 |
| 2016/0176538 | A1* | 6/2016 | Bekanich | G07C 5/085 |
| | | | | 701/14 |
| 2017/0052259 | A1* | 2/2017 | Murphy | B64D 25/20 |
| 2017/0106997 | A1* | 4/2017 | Bekanich | G08B 25/10 |
| 2017/0247118 | A1* | 8/2017 | Adler | G01S 5/0027 |
| 2017/0248676 | A1* | 8/2017 | Murphy | G01S 5/0231 |
| 2017/0248701 | A1* | 8/2017 | Adler | B64D 45/00 |
| 2018/0205658 | A1* | 7/2018 | Sullivan | H04W 84/06 |
| 2018/0299530 | A1* | 10/2018 | Polynin | G08G 5/0056 |

OTHER PUBLICATIONS

"Triggered Transmission of Flight Data Working Group Report," Bureau d'Engquetes et d'Analyses pour la securite de'aviation civile, Le Bourget Cedex—France, Mar. 18, 2011.

\* cited by examiner

EMERGENCY LOCALIZATION DEVICE, IN PARTICULAR ELT, FOR INITIATING AN EMERGENCY MEASURE

CROSS-REFERENCES TO RELATED APPLICATIONS

This application claims the benefit of the German patent application No. 10 2018 007 062.0 filed on Sep. 6, 2018, the entire disclosures of which are incorporated herein by way of reference.

FIELD OF THE INVENTION

The invention relates to an emergency localization device for initiating an emergency measure. The invention relates in particular to a so-called Emergency Locator Transmitter (ELT) for initiating an emergency measure.

BACKGROUND OF THE INVENTION

If aircraft encounter an emergency situation, a number of emergency measures are provided, such as emergency beacons, which inform the rescue and recovery personnel about the location of the aircraft, or flight recorders, which record flight and aircraft parameters for determining a cause of the emergency situation at a later date. Some of these emergency measures, such as the flight recorder, work continuously, while others, such as the emergency beacon, need to be activated. Emergency Locator Transmitters (ELTs) are currently equipped with acceleration sensors, which activate or trigger the emergency locator transmitter at high negative accelerations. The accelerometers typically activate the emergency measure at a moment in which the unusually high deceleration (negative acceleration) takes place.

Depending on the situation it cannot always be assumed that the ELTs will work, for example, at the moment of impact, and continue to work continuously and error-free thereafter. In the aviation field there are examples in which ELTs became inoperative due to the delay or for other reasons, before a communication connection could be established and a distress signal could be issued. Against this background, it appears desirable to provide means for a sufficiently early activation of emergency measures.

Such a sufficiently early activation is also desirable, for example, to initiate the transmission of flight records from the aircraft to a ground control in the event of an emergency. These transmitted flight records enable a rapid accident investigation without searching for the flight recorders, and avoid high costs during regular flight by continuous transmission of flight records.

Another challenge is faced in the case of another emergency measure in the form of ejectable flight recorders. Ejectable flight recorders (or "Deployable flight data recorders") are equipped with sensors that activate the ejection of the ejectable flight recorder. Such systems can be disadvantageous if an accidental activation occurs due to malfunctions of the sensors. This should be prevented to avoid damage occurring. It is also desirable, therefore, to provide means for preventing an unintentional activation of emergency measures, such as deployable flight data recorders.

In general, it is clear from the above statements that a robust and automated means for detecting aircraft emergencies is in principle desirable.

The object of the present invention is to provide a robust and automated emergency localization device, in particular an emergency locator transmitter (ELT), for early detection and triggering of aircraft emergencies.

SUMMARY OF THE INVENTION

An object of the invention is achieved by an emergency localization device, in particular an ELT, for initiating an emergency measure, wherein the emergency localization device comprises a control unit, at least one acceleration sensor and/or at least one position sensor, said control unit being configured to receive a plurality of motion and/or position parameters from the acceleration sensor and/or from the position sensor, and by evaluating the plurality of motion or position parameters to determine a risk level for an emergency by using a predefined logic, and to initiate an emergency measure if the calculated risk level exceeds a predefined threshold. By means of the emergency localization device according to the invention, an emergency measure can be advantageously initiated if the predefined threshold value is exceeded. In particular, an autonomous activation of emergency measures is possible. The autonomous activation takes place in accordance with the invention as soon as the aircraft emergency is detected (if the risk level has been determined using the pre-defined logic and this risk exceeded the predefined threshold). In an advantageous way, with the emergency localization device according to the invention no interaction of the cockpit crew with the emergency localization device is required in stressful emergency situations. If the cockpit crew of the aircraft are not themselves able to initiate a transmission of the emergency localization due to the nature of the emergency, this task is performed in an autonomous or automatic way by the emergency localization device according to the invention. This increases the reliability and robustness of the system.

A quite specific advantage of the emergency localization device according to the invention is that its functioning is largely independent of the aircraft's own systems. This is so because the emergency localization device itself has the sensors required for the determination of the risk level. These sensors of the emergency localization device themselves generate the acceleration and position parameters used for the determination of the risk level. The emergency localization device according to the invention is thus largely independent of data signals from aircraft-mounted systems and/or sensors (for example, acceleration sensors fitted to the aircraft). In a convenient manner, the emergency localization device according to the invention can therefore promptly initiate, for example, a transmission of the geospatial coordinates of the current position of the aircraft as an emergency measure. In this way, the rescue services can acquire the position of the aircraft in the emergency situation at an early stage. Thus, the actual geographical position can be determined in particular long before a possible collision.

A preferred embodiment of the emergency localization device is characterized in that the emergency localization device comprises an acceleration sensor implemented as a sensor for measuring a linear acceleration and/or an acceleration sensor implemented as a sensor for measuring an angular acceleration. This allows linear and/or angular accelerations of the emergency localization device, or indirectly of the aircraft in which the emergency localization device is (permanently) installed, to be measured and/or recorded.

In a preferred extension of the previous embodiment, the emergency localization device comprises at least one linear and/or at least one angular acceleration sensor for each of its three coordinate axes. In the case of systems built into the aircraft, the X-, Y- and Z-coordinate axes of the emergency localization device typically coincide with the X-, Y- and Z-coordinate axes of the aircraft or can be converted into them by a known vector transformation. In accordance with this embodiment, the emergency localization device thus comprises at least one linear and/or at least one angular acceleration sensor for each of the three coordinate axes of the aircraft. In a convenient way, therefore, linear and/or angular accelerations in or about all three coordinate axes of the emergency localization device or the aircraft can be detected. Thus, any atypical flight conditions can be discovered quickly, reliably and in a robust manner Particularly preferably the emergency localization device comprises three separate linear and/or three separate angular acceleration sensors for each of its three coordinate axes. The advantage due to this preferred embodiment is that, among other things, it enables a three-fold redundancy, to be described in more detail below, in the determination of the risk level.

In another preferred embodiment of the emergency localization device, parameters that are received and evaluated are selected from the group: linear acceleration in the X-direction, linear acceleration in the Y-direction, linear acceleration in the Z-direction, angular acceleration about the X-axis, angular acceleration about the Y-axis, angular acceleration about the Z-axis. The angular accelerations about the X-, Y- and Z-direction are (assuming the coordinate system of the emergency localization system when installed in the aircraft coincides with the aircraft coordinate system) are also known as roll acceleration (about the X-axis), pitch acceleration (about the Y-axis) and yaw acceleration (about the Z-axis). If the coordinate systems of the emergency localization system and aircraft diverge due to a special installation situation of the emergency localization system (a translational or rotational offset), then the coordinates and/or accelerations can nevertheless be transformed in a known manner By virtue of the fact that the motion parameters used to calculate the risk level are the linear accelerations in the X, Y, or Z-direction and the angular accelerations about the X, Y, or Z-axis, these calculations can be performed particularly robustly and reliably.

In another preferred embodiment, the emergency localization device comprises a position sensor implemented as a sensor for measuring a translational position, and/or a position sensor implemented as a sensor for measuring an angular position. In a convenient way therefore, translationally atypical positions of the emergency localization device or aircraft and/or atypical angular positions (rotationally atypical positions such as excessive yaw, pitch or roll positions) of the emergency localization device or of the aircraft can be detected. Thus, any atypical flight conditions can be discovered quickly, reliably and in a robust manner.

In addition, one preferred embodiment is characterized in that the emergency localization device comprises three position sensors, one for each of its three coordinate axes X, Y, Z. The advantage lies in the resulting three-fold redundancy according to the invention, described in more detail below. The position sensor or sensors can be so-called "static accelerometers." Alternatively, the position sensor or sensors can be centrifugal flight instruments, for example gyroscopes, or be implemented as such.

In a further particularly preferred embodiment of the emergency localization device, the parameters received and processed as position parameters are selected from the group: position in the X-direction, position in the Y-direction, position in the Z-direction, angular position about the X-axis, angular position about the Y-axis, angular position about the Z-axis. The angular position about the X-axis, angular position about the Y-axis and the angular position about the Z-axis (assuming the coordinate system of the emergency localization system when installed in the aircraft coincides with the aircraft coordinate system) are also referred to as the roll angle (about the X-axis), pitch angle (about the Y-axis) and yaw angle (about the Z-axis). If the coordinate systems of the emergency localization system and aircraft diverge due to a special installation situation of the emergency localization system (possibly having a translational or rotational offset), then the coordinates and/or corresponding angular positions can nevertheless be transformed or converted in a known manner By virtue of the fact that the position parameters used to calculate the risk level are the positions in the X, Y, or Z-direction and the angular positions about the X, Y, or Z-axis, these calculations can be performed particularly robustly and reliably.

In addition, a preferred embodiment is also one in which the control unit comprises at least one comparison device, which is configured to receive the motion and/or position parameters from the acceleration and/or position sensors, in order to determine the risk level for an emergency. By using the comparison device, the predefined logic can be implemented in order to achieve a three-fold redundancy according to the invention.

In a particularly preferred extension of the previous embodiment, in the comparison the predefined threshold is exceeded if of three acceleration parameter values originating from three acceleration sensors, each of which is assigned to a specific coordinate axis, two of the acceleration parameter values are outside of a predefined acceleration parameter limit. If the comparison device determines from the comparison that the predefined threshold value is exceeded, the control unit can initiate an emergency measure. An acceleration parameter limit is understood to mean a limit value for a corresponding type of acceleration. The limit value is such a value, which when exceeded means that an abnormal flight condition can typically be assumed. For example, an excessive angular acceleration about the Y-axis (the pitch axis) can indicate that the airplane is entering a stall situation (i.e., airflow cavitation) or is already in one.

In the comparison it is also preferable if the predefined threshold is exceeded if of three position parameter values originating from three acceleration sensors, each of which is assigned to a specific coordinate axis (X, Y, Z), two of the position parameter values are outside of a predefined position parameter limit. If the comparison device determines from the comparison that the threshold value is exceeded, the control unit can initiate an emergency measure. A location parameter limit is understood to mean a limit value for a corresponding type of position parameter. The parameter limit is such a value, which when exceeded means that an abnormal flight condition can typically be assumed. For example, an excessive angular position about the X-axis (the roll axis) can indicate that the airplane is in an abnormal flight condition.

In another preferred extension, in the comparison the predefined threshold is exceeded if either the acceleration parameter values exceed or fall below the acceleration parameter value limit or if the position parameter values exceed or fall below the position parameter limit. In this way, a particularly robust and reliable functioning of the emergency localization device according to the invention is ensured.

A particularly preferred further embodiment of the emergency localization device is characterized in that the acceleration or position sensors are arranged inside a housing of the emergency localization device, in particular in the interior of an ELT housing. Thus the emergency localization device is particularly independent of the aircraft-mounted systems and aircraft-mounted sensors or data transmissions. In addition, such an emergency localization device has a particularly compact design and can therefore be easily fitted.

In another preferred embodiment of the emergency localization device, the acceleration or position sensors and the control unit can be fitted to the emergency localization device as an external equipment unit, in particular to a housing of the emergency localization device. Thus, a retrofittable embodiment of the emergency localization device according to the invention can be implemented in a simple manner.

Finally, a preferred emergency localization device is one in which the transmission of the current geographical coordinates of the emergency localization device can be initiated as an emergency measure. In a convenient manner, the emergency localization device according to the invention can therefore promptly carry out a transmission of the geographical coordinates of the current position of the aircraft. Therefore the rescue services can acquire the position of the aircraft in the emergency situation at an early stage. The actual geographical position can be determined, in particular, long before a possible collision. This facilitates the initiation of rescue and/or recovery measures.

The above aspects and other aspects, features and advantages of the invention can also be derived from the exemplary embodiment, which will be described in the following with reference to the attached drawings.

BRIEF DESCRIPTION OF THE DRAWINGS

In the figures, the same reference numerals are used for identical or at least similar elements, components or aspects. It should be noted that the embodiments described in detail in the following are only illustrative and not restrictive. In the claims the word "comprising" does not exclude other elements and the indefinite article "a/an" does not exclude a plurality. The mere circumstance that particular features are cited in different dependent claims does not restrict the subject matter of the invention. Combinations of these features can be advantageously applied. The reference labels in the claims are not intended to restrict the scope of the claims. The figures are not drawn to scale but have only a schematic and illustrative character.

DETAILED DESCRIPTION OF THE PREFERRED EMBODIMENTS

Figure 1:
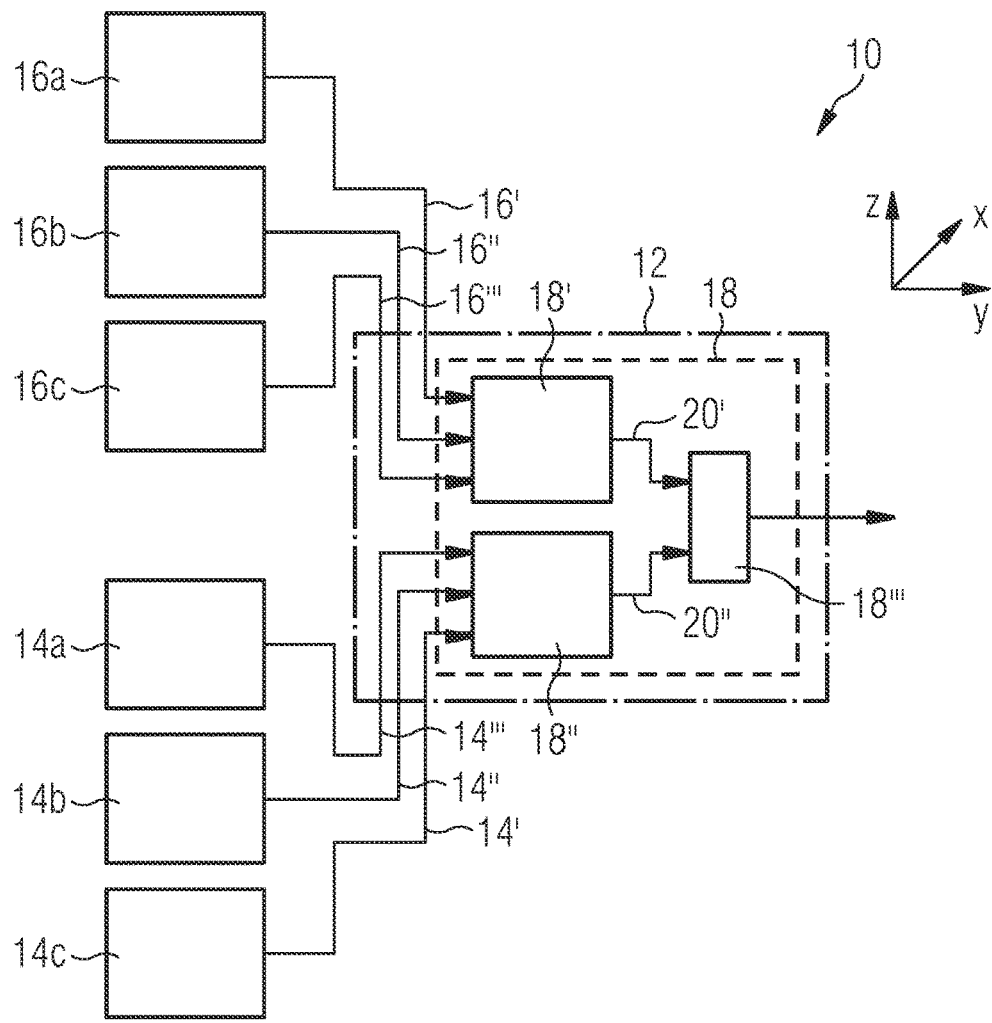
FIG. 1 shows a schematic diagram of the interaction of different functional elements, such as the acceleration and position sensors, of the emergency localization device according to the invention.

FIG. 1 shows an emergency localization device 10 for initiating an emergency measure. The emergency localization device 10 comprises a control unit 12. The emergency localization device 10 has three acceleration sensors 14$a$, 14$b$, 14$c$, one for each of its three coordinate axes (X-axis, Y-axis and Z-axis). Alternatively or additionally, the emergency localization device 10 can have three position sensors 16$a$, 16$b$, 16$c$, one for each of its three coordinate axes (X-axis, Y-axis and Z-axis). In FIG. 1, for the sake of clarity only the three acceleration sensors 14$a$, 14$b$, 14$c$ are shown, which are assigned to a single axis (e.g., only the Z-axis). Also, in FIG. 1, likewise for the sake of clarity, only the three position sensors 16$a$, 16$b$, 16$c$ are shown, which are also assigned to a single axis (e.g., only the Z-axis).

The control unit 12 is configured to receive a plurality of motion and position parameters 14', 14'', 14''', 16', 16'', 16''' from the acceleration sensors 14$a$, 14$b$, 14$c$ and from the position sensors 16$a$, 16$b$, 16$c$ and by evaluating the plurality of motion or position parameters 14', 14'', 14''', 16', 16'', 16''' using a predefined logic to determine a risk level for an emergency, and to initiate an emergency measure if the calculated risk level exceeds a predefined threshold. In an advantageous way, with the emergency localization device 10 interaction of the cockpit crew with the emergency localization device 10 is no longer required in an emergency situation. If the cockpit crew of the aircraft are not themselves able to initiate a transmission of the emergency localization due to the nature of the emergency, this is performed autonomously by the emergency localization device 10. The reliability and robustness of the emergency localization device 10 is therefore high. A further advantage of the emergency localization device 10 according to the invention is that its functioning is largely independent of the aircraft's own systems.

The acceleration sensors 14$a$, 14$b$, 14$c$ can each be designed as sensors for measuring a linear acceleration. Alternatively or in addition, the acceleration sensors 14$a$, 14$b$, 14$c$ can also be designed as sensors for measuring an angular acceleration. In FIG. 1, the acceleration sensors 14$a$, 14$b$, 14$c$ are only shown schematically, irrespective of whether they are sensors for measuring linear acceleration or sensors for measuring an angular acceleration. The emergency localization device 10 has three sensors 14$a$, 14$b$, 14$c$, one for each of its three coordinate axes (X-axis, Y-axis and Z-axis). Alternatively or additionally, for each of its three coordinate axes (X-axis, Y-axis and Z-axis) the emergency localization device 10 has three sensors 14$a$, 14$b$, 14$c$ for measuring an angular acceleration. In FIG. 1 for the sake of clarity only three sensors 14$a$, 14$b$, 14$c$ for measuring a linear acceleration and/or angular acceleration are shown.

According to the design of the acceleration sensors 14$a$, 14$b$, 14$c$, parameters that are received and evaluated as motion parameters 14', 14'', 14''' can represent, for example, a linear acceleration in the X-direction, a linear acceleration in the Y-direction or a linear acceleration in the Z-direction. Alternatively or in addition, parameters that are also received and evaluated as motion parameters 14', 14'', 14''' can represent an angular acceleration about the X-axis, an angular acceleration about the Y-axis or an angular acceleration about the Z-axis.

The position sensors 16$a$, 16$b$, 16$c$ can each be designed as sensors for measuring a translational position. Alternatively or in addition, the position sensors 16$a$, 16$b$, 16$c$ can also be designed as sensors for measuring an angular position. The emergency localization device 10 has three position sensors 16$a$, 16$b$, 16$c$, one for each of its three coordinate axes (X-axis, Y-axis, Z-axis).

According to the design of the position sensors 16$a$, 16$b$, 16$c$, parameters that can be received and evaluated as position parameters 16', 16'', 16''', for example, represent a position of the emergency localization device 10 in the X-direction, the Y-direction or the position in the Z direction. Alternatively or in addition, parameters that can be received and evaluated as motion parameters 16', 16", 16''' represent an angular position about the X-axis, an angular position about the Y-axis or an angular position about the Z-axis.

The control unit 12 comprises a comparison device 18, which is configured to receive the motion and/or position parameters 14', 14", 14''', 16', 16", 16''' from the acceleration and/or position sensors 14a, 14b, 14c, 16a, 16b, 16c in order to determine the risk level for an emergency. In the comparison the predefined threshold is exceeded, on the one hand, if of three acceleration parameter values 14', 14", 14''' originating from three acceleration sensors 14a, 14b, 14c, each of which is assigned to a specific coordinate axis X, Y, Z, two of the acceleration parameter values 14', 14", 14''' are outside of a predefined acceleration parameter limit. This part of the comparison can be carried out by a second comparison device element 18" of the comparison device 18.

On the other hand, in the comparison the predefined threshold is exceeded if of three position parameter values 16', 16", 16''' originating from three position sensors 16a, 16b, 16c, each of which is assigned to a specific coordinate axis X, Y, Z, two of the position parameter values 16', 16", 16''' are outside of a predefined position parameter limit. This part of the comparison can be carried out by a first comparison device element 18' of the comparison device 18.

In the comparison the predefined threshold is exceeded, in particular, when either 20" the acceleration parameter values 14', 14", 14''' exceed or fall below the acceleration parameter value limit or 20' if the position parameter values 16', 16", 16''' exceed or fall below the position parameter limit Such a comparison can be performed by a third comparison device element 18''' of the comparison device 18.

As an emergency measure, in particular, the broadcast of the current geographical coordinates of the emergency localization device 10 can be initiated. In principle it is also conceivable alternatively to initiate other emergency measures, such as starting the transmission of flight records from the aircraft to a ground control.

Figure 2:
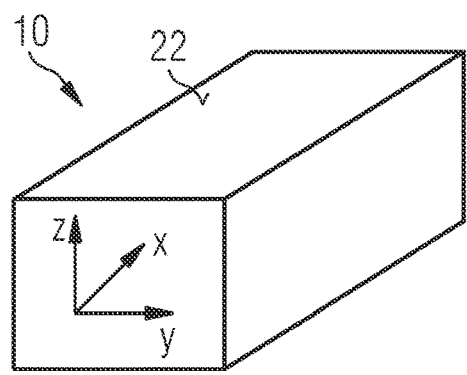
FIG. 2 shows a perspective view of a first embodiment of the emergency localization device according to the invention.

The emergency localization device 10 is shown in FIG. 2, in which the acceleration or position sensor or sensors 14a, 14b, 14c, 16a, 16b, 16c are arranged inside a housing 22 of the emergency localization device 10. The housing 22 is specifically a housing of the ELT (Emergency Locator Transmitter).

Figure 3:
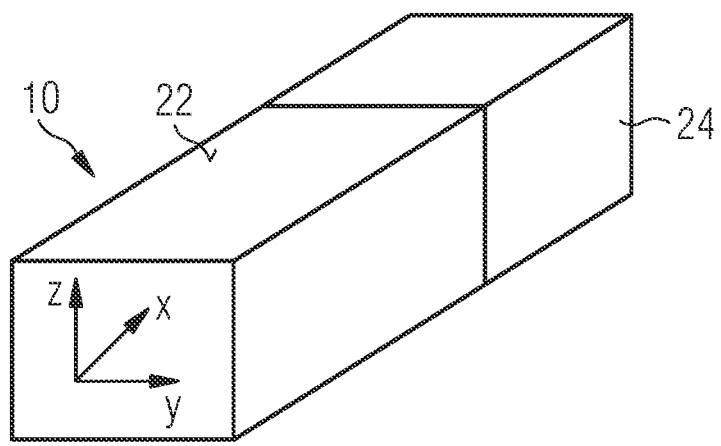
FIG. 3 shows a perspective view of a second embodiment of the emergency localization device according to the invention.

FIG. 3 shows an alternative emergency localization device 10, in which the acceleration or position sensor or sensors 14a, 14b, 14c, 16a, 16b, 16c and the control unit 12 can be fitted to the emergency localization device 10 as an external equipment unit 24, in particular to a housing 22 of the emergency localization device 10.

Figure 4:
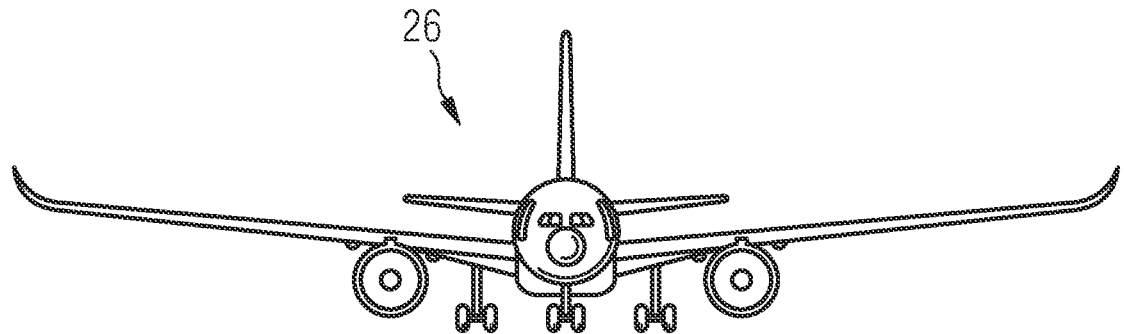
FIG. 4 shows an aircraft having an emergency localization device according to the invention.

FIG. 4 finally shows an airplane 26 having an emergency localization device 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An emergency localization device for initiating an emergency measure, comprising:
   a housing,
   a control unit, and
   at least one of an acceleration sensor or a position sensor, wherein, the control unit is configured to receive a plurality of at least one of motion or position parameters from the at least one of the acceleration sensor or the position sensor and, by evaluating the plurality of motion or position parameters, to determine a risk level for an emergency by using a predefined logic, and to initiate an emergency measure when the calculated risk level exceeds a predefined threshold,
   wherein both the control unit and the at least one of the acceleration sensor or the position sensor are disposed in the housing, and
   wherein the evaluating by the control unit is independent of data from aircraft mounted sensors.

2. The emergency localization device according to claim 1, wherein the emergency localization device comprises an acceleration sensor implemented as at least one of a sensor for measuring linear acceleration or an acceleration sensor implemented as a sensor for measuring an angular acceleration.

3. The emergency localization device according to claim 2, wherein the emergency localization device comprises at least one of a linear acceleration sensor or an angular acceleration sensor for each of its three coordinate axes.

4. The emergency localization device according to claim 2, wherein the emergency localization device comprises three linear acceleration sensors or three angular acceleration sensors for each of its three coordinate axes.

5. The emergency localization device according to claim 1, wherein as motion parameters, parameters are received and evaluated that are selected from the group consisting of: linear acceleration in the X-direction, linear acceleration in the Y-direction, linear acceleration in the Z-direction, angular acceleration about the X-axis, angular acceleration about the Y-axis, angular acceleration about the Z-axis.

6. The emergency localization device according to claim 1, wherein the emergency localization device comprises at least one of a position sensor, implemented as a sensor for measuring a translational position or a position sensor implemented as a sensor for measuring an angular position.

7. The emergency localization device according to claim 1, wherein the emergency localization device comprises three position sensors for each of its three coordinate axes.

8. The emergency localization device according to claim 1, wherein as position parameters, parameters are received and evaluated which are selected from the group consisting of: position in the X-direction, position in the Y-direction, position in the Z-direction, angular position about the X-axis, angular position about the Y-axis, angular position about the Z-axis.

9. The emergency localization device according to claim 1, wherein the control unit comprises at least one comparison device, which is configured to receive the motion or position parameters from the acceleration or position sensors in order to determine the risk level for an emergency.

10. The emergency localization device according to claim 9, wherein in the comparison the predefined threshold is exceeded if of three acceleration parameter values originating from three acceleration sensors, each of which is assigned to a specific coordinate axis, two of the acceleration parameter values are outside of a predefined acceleration parameter limit.

11. The emergency localization device according to claim 9, wherein in the comparison the predefined threshold is exceeded if of three position parameter values originating from three position sensors, each of which is assigned to a specific coordinate axis, two of the position parameter values are outside of a predefined position parameter limit.

12. The emergency localization device according to claim 10, wherein in the comparison, the predefined threshold is exceeded if either the acceleration parameter values exceed or fall below the acceleration parameter value limit, or if the position parameter values exceed or fall below the position parameter limit.

13. The emergency localization device according to claim 1, wherein the housing is configured to be fitted to the emergency localization device as an external equipment unit.

14. The emergency localization device according to claim 1, wherein a transmission of the current geographical coordinates of the emergency localization device can be initiated as an emergency measure.

15. The emergency localization device according to claim 1, wherein the emergency localization device comprises an emergency locating transmitter.

16. The emergency localization device according to claim 15, wherein the emergency locating transmitter is disposed inside the housing.

17. The emergency localization device according to claim 15, wherein the housing is configured to be fitted as an external equipment unit.

18. An emergency localization device for initiating an emergency measure, comprising:
   a control unit, and
   at least one position sensor for each of the three coordinate axes,
   wherein, the control unit is configured to receive a plurality of position parameters from the at least one position sensor for each of the three coordinate axes and, by evaluating the plurality of position parameters, to determine a risk level for an emergency by using a predefined logic, and to initiate an emergency measure when the calculated risk level exceeds a predefined threshold,
   wherein the evaluating by the control unit is independent of data from aircraft mounted sensors.

\* \* \* \* \*